O. H. Jewell.
Piston Rod Packing.
Nº 85,890.      Patented Jan. 12, 1869.
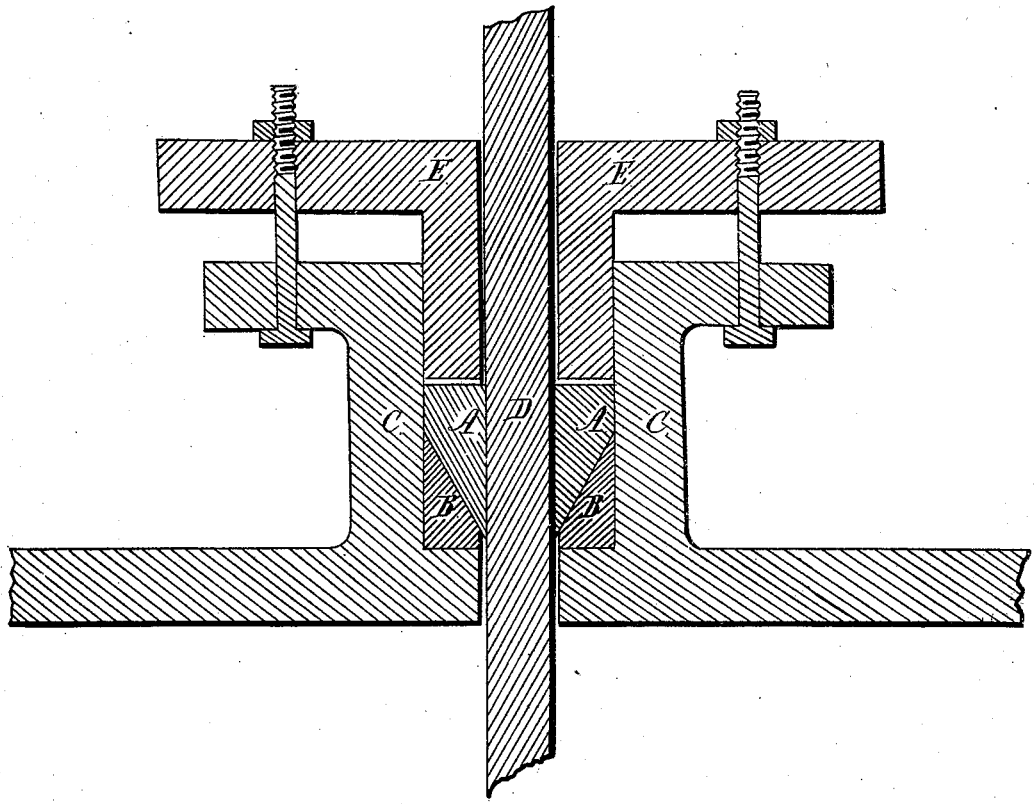
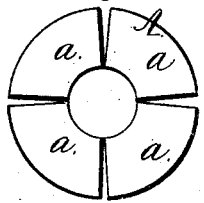 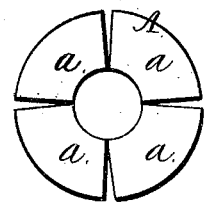
Witnesses:
Inventor: Omar H. Jewell

UNITED STATES PATENT OFFICE.

OMAR H. JEWELL, OF CHICAGO, ILLINOIS, ASSIGNOR TO HIMSELF, A. N. TOWNE, AND F. H. COOLEY, OF SAME PLACE.

IMPROVEMENT IN PISTON-ROD PACKING.

Specification forming part of Letters Patent No. 85,890, dated January 12, 1869.

*To all whom it may concern:*

Be it known that I, OMAR H. JEWELL, of the city of Chicago, in the county of Cook and State of Illinois, have invented new and useful Wooden Packing; and I do hereby declare that the following is a full and exact description thereof, reference being had to the accompanying drawings, making part of this specification, in which—

Figure 1 represents a section of the stuffing-box and the packing. Fig. 2 is the top view of the packing-block, and Fig. 3 is the bottom view of the same.

The nature of my invention consists in the application of wood for packing to be used on steam-engines for piston-rods, valve-stems, &c., for force-pumps and other machines, and arranged in the shape and manner best suited to said various machines and various purposes. It consists also in the particular arrangement of wooden packing for piston-rods, valve-stems, &c., as will be hereinafter fully explained.

To enable others skilled in the art to which my invention appertains to make and use the said invention, I will proceed to describe its construction and operation.

Without saying much about the inconveniences of the hemp or cotton used as packing in the engines, the metallic packing even has many objectionable points, particularly that made of soft metals, which, when used for rod or stem packing, are apt to be affected by the heat; but the packing made of wood does not possess any of the above-mentioned inconveniences. It will not cut the rod, is not so easily affected by the heat as the soft metals and the other packing are, it readily conforms to the shape of rods, stems, &c. It is cheap and lasting, and when worn out is easily replaced by a new packing.

The experiments tried on several railroad-locomotives with wooden packing applied to piston-rods and valve-stems demonstrated sufficiently its value and its superiority over metallic and other packings.

The manner in which I apply said packing to piston-rods and valve-stems consists in making a wooden block, A, cylindrical at the top and conical at the bottom, provided with a round opening in the center to fit the rod or stem, which block is sawed into two or more equal parts, *a a*, and a portion of wood on the inside surfaces of the parts *a a* whittled away, as shown on Figs. 2 and 3. The block thus arranged is placed into a conical seat, B, and the whole placed into the stuffing-box C, and screwed down tight onto the rod D by the gland or follower E. As the packing-block wears off the gland is tightened, and the block slides down on the incline of the seat gradually until the cylindrical portion of it is worn out, when it has to be replaced by a new block. The same packing can be used for force-pumps. For pistons, I prepare a wooden hoop or hoops, and insert them into the groove or grooves of the piston. The wooden packing may be used also in other machinery to a great advantage.

Having thus described my invention and its application, what I claim as new, and desire to secure by Letters Patent, is—

The packing consisting of conical segmental wooden blocks, constructed and arranged to operate substantially as described.

OMAR H. JEWELL.

Witnesses:
J. B. TURCHIN,
L. H. LANE.